(12) United States Patent
Podlipskiy

(10) Patent No.: US 11,713,420 B2
(45) Date of Patent: Aug. 1, 2023

(54) SYSTEM AND METHOD FOR EXTRACTING LIQUID AND SOLID HYDROCARBONS AND THEIR DERIVATIVES

(71) Applicant: Petroteq Energy, Inc., Toronto (CA)

(72) Inventor: Vladimir Y. Podlipskiy, San Diego, CA (US)

(*) Notice: Subject to any disclaimer, the term of this patent is extended or adjusted under 35 U.S.C. 154(b) by 159 days.

(21) Appl. No.: 17/141,811

(22) Filed: Jan. 5, 2021

(65) Prior Publication Data

US 2021/0207034 A1 Jul. 8, 2021

Related U.S. Application Data

(60) Provisional application No. 62/957,716, filed on Jan. 6, 2020.

(51) Int. Cl.
| | |
|---|---|
| *C10G 1/04* | (2006.01) |
| *B01D 11/02* | (2006.01) |
| *B04B 1/08* | (2006.01) |
| *B04B 1/20* | (2006.01) |
| *B03B 9/02* | (2006.01) |

(52) U.S. Cl.
CPC .......... *C10G 1/045* (2013.01); *B01D 11/0257* (2013.01); *B01D 11/0261* (2013.01); *B01D 11/0276* (2013.01); *B01D 11/0284* (2013.01); *B01D 11/0288* (2013.01); *B03B 9/02* (2013.01); *B04B 1/08* (2013.01); *B04B 1/20* (2013.01); *B04B 2001/2058* (2013.01)

(58) Field of Classification Search
CPC ................ C10G 1/045; B01D 11/0257; B01D 11/0261; B01D 11/0276; B01D 11/028; B01D 11/0284; B01D 11/0288; B01D 11/0292; B03B 9/02; B04B 1/08; B04B 1/20; B04B 2001/2058
See application file for complete search history.

(56) References Cited

U.S. PATENT DOCUMENTS

| | | | |
|---|---|---|---|
| 2012/0145603 A1* | 6/2012 | Kift ........................ | C10G 1/045 208/390 |
| 2019/0256783 A1* | 8/2019 | Shelton, Jr. ............... | C10C 3/08 |

\* cited by examiner

*Primary Examiner* — Brian A McCaig
(74) *Attorney, Agent, or Firm* — Michael A DiNardo; Iain Hill; YK Law, LLP

(57) ABSTRACT

A system and method for extracting liquid and solid hydrocarbons and their derivatives from natural and man-made hydrocarbon sources, including but not limited to oil sands, bitumen, asphalt, roofing shingles, and other hydrocarbon articles of manufacture. The hydrocarbon sources are prepared by dissolving, crushing and/or grinding. The prepared hydrocarbon sources are subjected to agitation where the solvent and hydrocarbon source as thoroughly mixed. The results of the agitation are then separated in one or both of a mesh screen shaker and a centrifuge. The mesh screen shaker subjects the materials to medium frequency oscillations. The centrifuge subjects the materials to high G-forces. The combined processes separate the hydrocarbons from solids and residual solids to less than 0.2% by weight.

18 Claims, 6 Drawing Sheets

|  | Agitator | Shaker | Centrifuge |
|---|---|---|---|
| Input |  |  |  |
| Mineral solids | ~85-90% | 60-70% | 1-5% |
| Hydrocarbons | ~5-15% | 30-40% | 95-99% |
| HC Output |  |  |  |
| Mineral solids | 60-70% | 1-5% | <0.2% |
| Hydrocarbons | 30-40% | 95-99% | 99.8-99.9% |
| Solids Output |  |  |  |
| Mineral solids | NA | 95-99% | >99.8% |

FIG. 6

SYSTEM AND METHOD FOR EXTRACTING LIQUID AND SOLID HYDROCARBONS AND THEIR DERIVATIVES

RELATED APPLICATION

This application claims the benefit of U.S. Provisional Patent Application No. 62/957,716, filed on Jan. 6, 2020.

BACKGROUND OF THE INVENTION

The present invention is directed to systems and methods for extracting and recovering solid and liquid hydrocarbons (e.g., liquefied hydrocarbon mixtures) and their derivatives from natural and/or synthetic hydrocarbon containing matter, materials, or sources (e.g., raw hydrocarbon materials). More specifically, the invention utilizes a three-stage, sequential extraction process to physically separate oil from oil sands and similar mixtures, including loose sands or partially consolidated sandstone containing a naturally occurring mixture of sand, clay, and water, soaked with oil.

Most extraction systems and methods for oil sands involve in-situ techniques that typically use significant amounts of water and energy. Such conventional oil extraction systems and methods also produce a great deal of contaminated water after extraction. An important consideration when attempting to extract oil sands is the wettability of the rock or sand where an oil sand deposit is situated. There are basically two types of wettability that are encountered when dealing with oil sands. They are water wet and oil wet. In the water wet condition, a thin film of water coats the surface of the bitumen contained within the oil sand. Various techniques have been effective with water wet oil sands for extracting bitumen. One such technique is a conventional hot water process where the hot water washes bitumen from the oil sand and replaces it with water. Techniques for recovering bitumen from oil wet oil sands, however, have been more problematic.

In the oil wet condition, the material surrounding the bitumen is in direct contact with bitumen. This condition is much more difficult from an extraction standpoint because the traditional hot water process is not as effective. On this point, various extraction methods for oil wet oil sands have been attempted using heat, ultrasonic waves, and microwaves, but none have been commercially successful. In addition, various types of solvents have also not been successful for this purpose. Furthermore, no commercially viable method has been developed that can extract bitumen equally well from either water wet or from oil wet oil sands.

Accordingly, there is a need for improved systems and methods for separating oil sands that uses less water, less energy, and produces less contamination. The present invention fulfills these needs and provides other related advantages.

SUMMARY OF THE INVENTION

A method for extracting (crude oil) liquefied hydrocarbons mixture from (raw hydrocarbon materials) natural and/or synthetic hydrocarbon materials/matter requires an appreciation of the wide variety of different materials that can be processed by the present invention. These materials include: i) oil sands; ii) hydrocarbon sediments; iii) asphalt shingle waste; iv) asphalt paving waste; v) oil shale; vi) rubber tires; and vii) other hydrocarbon solid and/or viscous waste. In accordance with the present invention, any of the above-listed raw hydrocarbon materials/matter can be prepared (e.g. crushed, ground, etc.), either individually or collectively, for hydrocarbon extraction processing.

As a first step in the process, raw hydrocarbon materials/matter are prepared and then agitated to extract hydrocarbons therefrom. The extracted hydrocarbons will typically be in the form of one or more of bitumen, heavy oil, kerosene and diesel range hydrocarbons. In any case, the extracted hydrocarbons will form a slurry with a relatively high percentage of solids (e.g. 60-70% by weight). In the next step in the process, the extracted hydrocarbons are shaken to remove most of the solids from the bitumen or heavy oil. The result here is a partially processed crude oil (liquid phase hydrocarbons mixture) that still contains residual solids (e.g. up to 10%). A final processing step, using high G-forces, separates most of the residual solids from the processed crude oil (partially processed liquid phase hydrocarbons) mixture. This results in a useable crude oil (useable/afforded liquid phase hydrocarbons) mixture containing less than 0.1% solids, which is suitable for refining.

In a particularly preferred embodiment, the inventive process for extracting raw hydrocarbons from hydrocarbon containing material includes preparing the hydrocarbon containing material to create a prepared hydrocarbon ore. A hydrocarbon solvent is added to the prepared hydrocarbon ore to create a hydrocarbon slurry. The hydrocarbon slurry is then agitated in an extraction tank and hydrocarbon slurry is transferred to a mechanical separator. Then raw hydrocarbons are mechanically separated from the hydrocarbon slurry.

The preparing step may include one or more of tearing, crushing, and grinding of the hydrocarbon containing material. The agitating step may further include adding a secondary solvent to the prepared hydrocarbon ore; and the mechanically separating step may further include recovering the secondary solvent from the raw hydrocarbon.

The mechanically separating step may include shaking the hydrocarbon slurry in a screen mesh shaker to produce a first extractant product. The screen mesh shaker preferably separates solid particles having a diameter greater than 300 microns from the first extractant product. The screen mesh shaker may include an angle adjuster on a frame wherein the angle adjuster pivots the frame between fifteen degrees below and above a horizontal plane.

The mechanically separating step may further include spinning the extractant product in a centrifuge to produce a second extractant product. The centrifuge spins the extractant product applying G-forces greater than 3,000 Gs. The spinning step may follow the shaking step such that the second extractant product from the shaker is passed through the centrifuge to produce a second extractant product.

The hydrocarbon solvent preferably is a very short chain hydrocarbon. The extractant product from the agitating device preferably includes about 60%-70% solids by weight. The second extractant product from the shaker preferably comprises about 1%-5% solids by weight. The second extractant product from the centrifuge preferably comprises less than 0.2% solids by weight.

In the particularly preferred embodiment, a system for extracting raw hydrocarbons from hydrocarbon containing material has an agitating device with an extraction tank for mixing the hydrocarbon containing material with a solvent and producing a hydrocarbon extractant. A first separating device is in fluid communication with an outlet on the agitating device for receiving the hydrocarbon extractant and producing a second hydrocarbon extractant. A second separating device is in fluid communication with an outlet on the first separating device for receiving the second hydrocarbon extractant and producing a third hydrocarbon extractant. A hydrocarbon recovery tank is then in fluid communication with an outlet on the second separating device for receiving the third hydrocarbon extractant.

The first separating device is preferably a shaking device having a screen mesh basket in fluid communication with the outlet on the agitating device. The shaking device also has a vibrating motor for vibrating the screen mesh bed. The second separating device comprises a centrifugal device in fluid communication with the outlet on the first separating device, the centrifugal device having a spinning motor for subjecting the second hydrocarbon extractant to G-forces greater than 3,000 Gs.

The shaking device preferably includes a frame defining a longitudinal axis and a lateral axis, wherein the longitudinal axis and the lateral axis are orthogonal to each other. The screen mesh basket is adapted for engagement with the frame and to receive the hydrocarbon extractant from the agitating device. The screen mesh basket is adapted for disengagement from the frame to periodically remove solids therefrom. The screen mesh basket is preferably made from a mesh selected from the group consisting of a woven metal cloth, a combination of at least one metal cloth and a backing cloth, and a corrugated mesh.

The vibrating motor is engaged with the frame for vibrating the frame and the screen mesh basket along the longitudinal axis of the frame. The vibrating device preferably includes a second vibrating motor for vibrating the frame and the screen mesh basket back and forth along the lateral axis. An angle adjustment motor for orienting the frame with the screen mesh basket, at a predetermined inclination angle ($\varphi$) measured around the lateral axis relative to the longitudinal axis. The inclination angle ($\varphi$) is preferably in a range of 15° above and 15° below a horizontal plane.

The system further includes a feeder device for receiving hydrocarbon extractant from the agitating device, and for transferring a predetermined volume of hydrocarbon extractant to the shaking device. A by-pass valve may be included for returning excess hydrocarbon extractant from the shaking device to the agitating device. The shaking device further includes a collection pan for receiving underflow from the screen mesh basket when the shaking device is in operation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6 is a table presenting input and output compositions (by percentage weight) at each stage of the process.

DETAILED DESCRIPTION OF THE PREFERRED EMBODIMENTS

Figure 1:
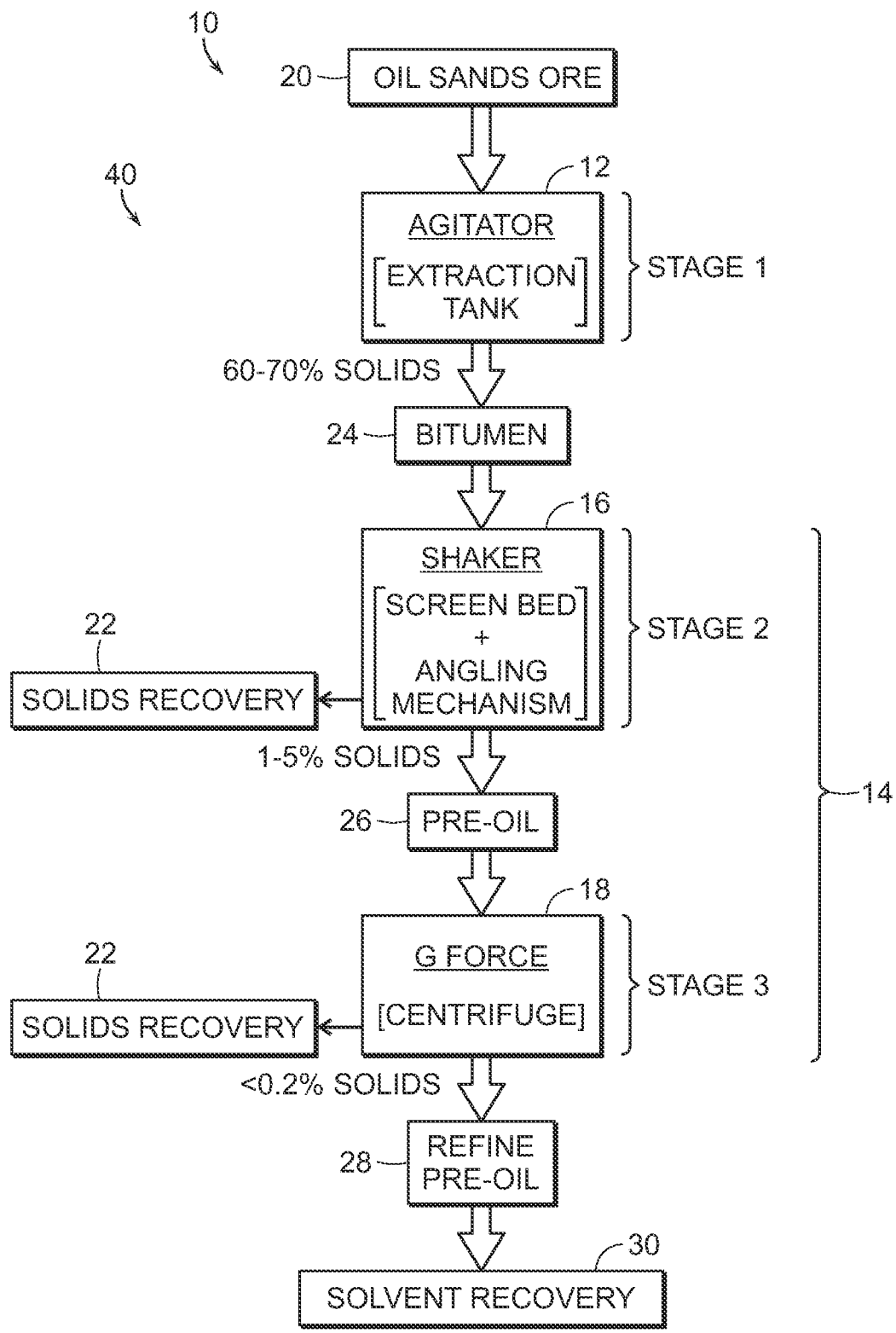
FIG. 1 is a flow chart illustrating the steps of the method for extracting of the present invention.

In the following detailed description, the oil extraction method for extracting hydrocarbons is generally referred to by reference numeral 10 in FIG. 1. The process 10 generally includes sequential steps of agitating 12 and physical separating 14. In a particularly preferred embodiment, the physical separating 14 may comprise shaking 16 and/or centrifuging 18 the product from the agitating step 12.

The following description will detail the process 10 in terms of extraction from oil sands, however, the process can be used on various raw materials (both naturally occurring and man-made), including but not limited to, oil wet oil sands, water wet oil sands, shale oil, roofing shingles synthetic asphalt, and natural asphalt. When dealing with oil sands, the raw material typically comprises about 10% hydrocarbons and 90% minerals, i.e., silica, sand, shale, rocks, etc. The raw materials typically include liquid and solid components. The liquid components include oil, water, and other liquids. The solids generally contain mineral based solids, i.e., silica, sand, shale, rocks, etc., and hydrocarbon-based solids, i.e., long chain hydrocarbons as described below.

In the particularly preferred operation of the invention, the slurry of raw ore and hydrocarbon solvent is first agitated, then shaken, then centrifuged. As described in the prior art agitator patent (U.S. Pat. No. 9,884,997), the agitator may involve separation of mineral solids from the hydrocarbon component. In the particularly preferred embodiment, the agitation step does not involve any separation of mineral solids. The prior art separation of mineral would necessarily involve separation of some hydrocarbon solids as well. In typical raw ore, the hydrocarbon content may include about 10% hydrocarbon solids, which hydrocarbon solids are also removed with the mineral solids. If the minerals solids are not removed in the agitator operation, then the hydrocarbon solids, i.e., long chain hydrocarbons, are retained in the slurry through the shaker step (and/or centrifuge step) so as to facilitate further dissolving in the solvent. The table shown in FIG. 6 presents the approximate percentage numbers by weight of mineral solids and hydrocarbons (both liquids and solids), at each stage accounting for no solids removal by the agitator. The "Solids Output" row identifies the solids removed relative to the mineral solids remaining in the hydrocarbon output. The "Hydrocarbons" rows identify both liquid and solid hydrocarbons.

The hydrocarbons in the natural raw materials such as oil sands are typically a mix of short, middle, and long chain hydrocarbons containing both liquid and solid components. The short and middle chains comprise about 90% of the total hydrocarbons and the long chains comprise about 10% of the total hydrocarbons. Short chain typically refers to between eight and twenty carbon atoms on the chain and is usually in liquid form at ambient temperatures. Middle chain typically refers to between twenty and twenty-five carbon atoms on the chain and is usually in a heavy, sticky liquid form at ambient temperatures. Long chain typically refers to thirty or more carbon atoms on the chain and is usually a solid, such as asphaltenes, at ambient temperatures. The process described herein can be modified depending on the composition of the raw materials according to the principles disclosed.

Solvents introduced to the hydrocarbons may facilitate dissolving of hydrocarbon chains of all lengths. The solvent is generally a very short chain hydrocarbon (five to eight carbon atoms), including oxygenated derivatives of these very short chain hydrocarbons, and works on the principle of like dissolves like. The process of dissolving generally depends on temperature and residence time. Increased temperatures increase the rate of dissolving. Increased residence time increases the extent of dissolving. The present invention generally achieves desirable rates and extent of dissolving without increased temperatures and increased residence times. This is achieved through mixing of the hydrocarbons and solvent with varying intensities.

The process generally involves providing 20 a supply of raw materials, in this example oil sands ore. The oil sands ore is agitated 12, as in an extraction tank 48 in an agitator 42 as described more fully below. From the agitation 12, the product is then mechanically separated 14, in either a shaker 16 or a centrifuge 18—or both. A solvent 21 is added to the raw materials in the extraction tank 48 creating a hydrocarbon slurry 24. The solvent 21 introduced into the extraction tank 48 immediately begins dissolving the hydrocarbons. The process of dissolving generally proceeds at ambient temperature and begins right away, particularly as to the shorter chain hydrocarbons.

The very short chain hydrocarbon solvent begins by first dissolving the short chain hydrocarbons, then the middle chain hydrocarbons, and finally the long chain hydrocarbons depending on the intensity of mixing and the elapsed time since introduction of the solvent. Short chain hydrocarbons are dissolved relatively quickly. Middle and long chain hydrocarbons take longer to dissolve with middle chains dissolving quicker than long chains. Mixing of the raw materials increases how fast the solvent acts, particularly as to medium and long chain hydrocarbons. In the long chain hydrocarbons, particularly the solid forms, the solvent has little efficacy without intense mixing, especially in the absence of increased temperatures and residence times.

The agitating step 12 mixes the solvent 21 with the supply of raw 20 materials forming a hydrocarbon slurry 24, wherein the solvent begins dissolving the hydrocarbons as discussed. The hydrocarbon slurry 24 from the agitator 12—sometimes referred to as bitumen with oil sands raw materials—may comprise about 60-70% mineral solids by weight with the balance hydrocarbons—both liquid and solid—for recovery. The hydrocarbon slurry 24, including the added solvent, is then sent to further processing by physical separation 14. Depending on the specific contents of the hydrocarbon slurry 24, the physical separation 14 may comprise one or more of shaking 16 and centrifuging 18. Most preferably, both shaking 16 and centrifuging 18 is utilized.

The shaking step 16 produces recovered solids 22 and a first extractant 26—sometimes referred to as a pre-oil—which preferably contains about 1-5% mineral solids by weight. The recovered solids 22 comprise about 95%-99% by weight of the hydrocarbon slurry 24. The centrifuging step 18 also produces recovered solids 22 and a second extractant 28—sometimes referred to a clean pre-oil—which preferably contains less than 0.2% solids by weight. In addition to the physical separation 14 of the shaking 16 and centrifuging 18, the inclusion of the solvent added during the agitating 12 step improves the hydrocarbon extraction that takes place in the shaking 16 and centrifuging 18 steps. The physical mixing of the shaking 16 and centrifuging 18 increases the rate of dissolving of the medium and long chain hydrocarbons, particularly the solid long chain hydrocarbons. As the shaking 16 and centrifuging 18 steps physically separate the components, the solvent extracts further hydrocarbons from the medium and long chain hydrocarbons. The short and medium chain hydrocarbons dissolved in the agitating 14 step create an improved solvent mixture that acts more readily on the long chain hydrocarbons.

The shaking step 16 involves application of oscillating frequencies to physically separate a liquid portion of the hydrocarbon slurry 24 from a solid portion through a screen filter 54a, as described below. The centrifuging 18 involves application of high velocity spinning forces to physically separate the liquid portion of the first extractant 26 from the solid portion through application of g-forces. As described above, the physical shaking of the first extractant 26, including the solvent from the agitating 12 step, moves additional hydrocarbons from the solid phase to the liquid phase which additional hydrocarbons are separated as part of either the shaking 16 or centrifuging 18 steps—or both. The final or second extractant 28, is then passed through a solvent recovery step 30 as by distillation or other known processes to remove the solvents added during the agitating step 12.

The system of the present invention that practices the method 10 is generally referred to by reference numeral 40, with the components shown in FIGS. 2-5. The primary components of the system 40 in a particularly preferred embodiment represent an agitation device 42, a shaking screen device 44, and a centrifuge device 46. As mentioned above, either then shaking screen device 44 or the centrifuge device 46 may be omitted depending on the hydrocarbon components in the material to be processed.

According to the prior art, the agitator 42 would separate about 70%-80% of the mineral solids by weight, passing the remainder to the next stages. A particularly preferred embodiment of the present invention comprises each of an agitator 42, a shaker 44, and a centrifuge 46 in stages. The prior art removal of mineral solids in the agitator 42 would also remove hydrocarbon solids, which eliminates the possibility of dissolving and recovering those solid hydrocarbons. In the preferred embodiment, the agitator 42 passes all materials, including the 70%-80% mineral solids by weight removed in the prior art, to the second stage.

In this preferred embodiment, the second stage or shaker 44 is now designed to remove up to 80%-90% of solids by weight (consisting of the 70%-80% mineral solids removed by the agitator in the prior art plus an additional 10% of the original mineral solids by weight removed by the shaker). The vibrational action of the shaker 44 increases the rate and efficiency of dissolving the hydrocarbons, including the long chain solid hydrocarbons, thereby increasing the overall hydrocarbon yield of the process. The third stage or centrifuge 46 is designed to remove the remaining 10% of the mineral solids by weight. Carrying the mineral solids over from the agitator 42 to the shaker 44 increases the mixing and exposure time of the solvent and increases the amount of long chain hydrocarbons dissolved through the shaker 44. A system 40 used in accordance with this preferred embodiment produces a final product of refined pre-oil including less than 0.2% of the original mineral solids by weight and having increased yield of hydrocarbon recovery.

Consistent with the present invention, hydrocarbons can be removed from natural or man-made sources. Natural sources include raw oil sands or similar deposits in the earth. Raw oil sands typically consist of sand-like materials soaked with oil. The sand-like material may be loose sands or partially consolidated sandstone containing a naturally occurring mixture of sand, clay, and water. Man-made sources can include roofing shingles, car tires, or other petroleum-based articles of manufacture. Regardless of whether the source is natural or man-made, the hydrocarbon source must be prepared for extraction.

Figure 2:
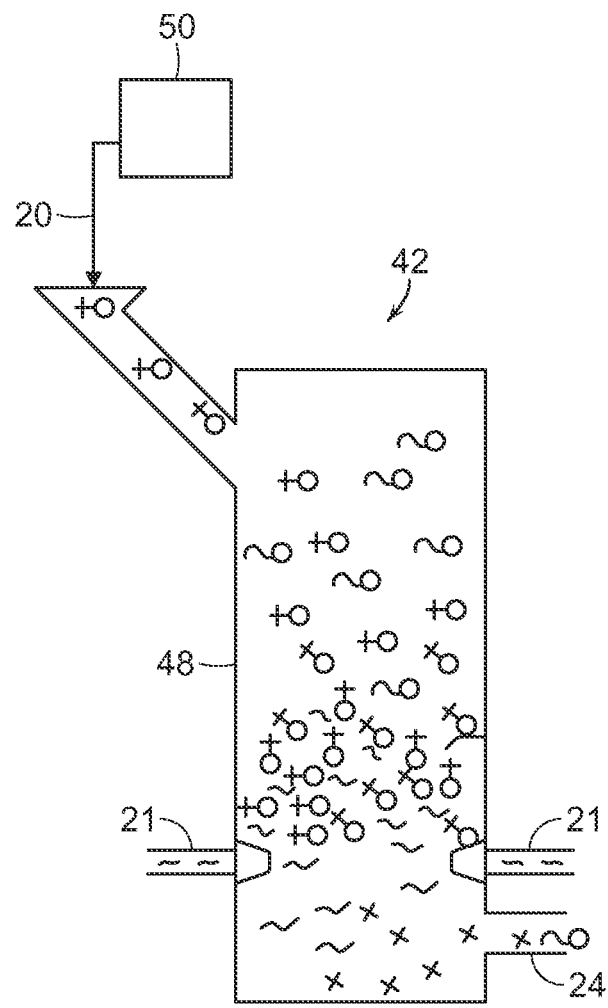
FIG. 2 is a schematic illustration of an agitating extractor tank used in the system of the present invention.

As illustrated is FIG. 2, the first stage or agitator 42 includes an extraction tank 48 that receives prepared hydrocarbon containing materials. The hydrocarbon materials are preferably prepared by crushing or grinding to a general particle size ¼" or less. The agitator 42 is preferably of the type that is disclosed and claimed in U.S. Pat. No. 9,884,997, the disclosure of which is herein incorporated by reference. As described therein, prior to the extractor tank 48, the raw materials, such as oil sands, are prepared and interact with a pressurized liquid extractant to structurally decompose the oil sands and chemically separate hydrocarbons from the minerals, producing a hydrocarbon slurry.

The hydrocarbon slurry 24 that is produced by the agitator 42 preferably contains residual solids that constitute a weight in a range of 60-70% of the slurry weight. In the case of man-made hydrocarbon sources, an acid washing may similarly take place in the extractor tank 48 to break down the man-made hydrocarbons producing the hydrocarbon slurry having a similar weight range.

The agitating extractor 42 processes oil sands in the extractor tank 48, which receives the prepared source. Preparation of the source may involve crushing the hydrocarbon source as in a mechanical crusher or grinder 50. The agitating extractor 42 provides the extractor tank 48 as a vessel to provide mixing and residence time for the solvent to react with the hydrocarbon source. Ideally, the output from the extraction tank 48 includes solids that are less than ¼" in diameter.

In the case of raw oil sands and similar deposits, the loose sands or sandstone tend to have particle sizes too large for subsequent processing. Preparation of such raw oil sands involves crushing or grinding those particles to reduce the overall particle size to less than ¼" in largest diameter. In the case of man-made sources, the manufactured article must be torn, grinded, or pre-crushed to form it into smaller chunks. The prepared man-made source of hydrocarbons is then processed through an acid washing to dissolve or decompose the source into solid particles soaked in petroleum. When necessary, the acid may be separated from the dissolved source. The agitating 12 step preferably removes between 70-80% of the mineral solids.

Figure 3:
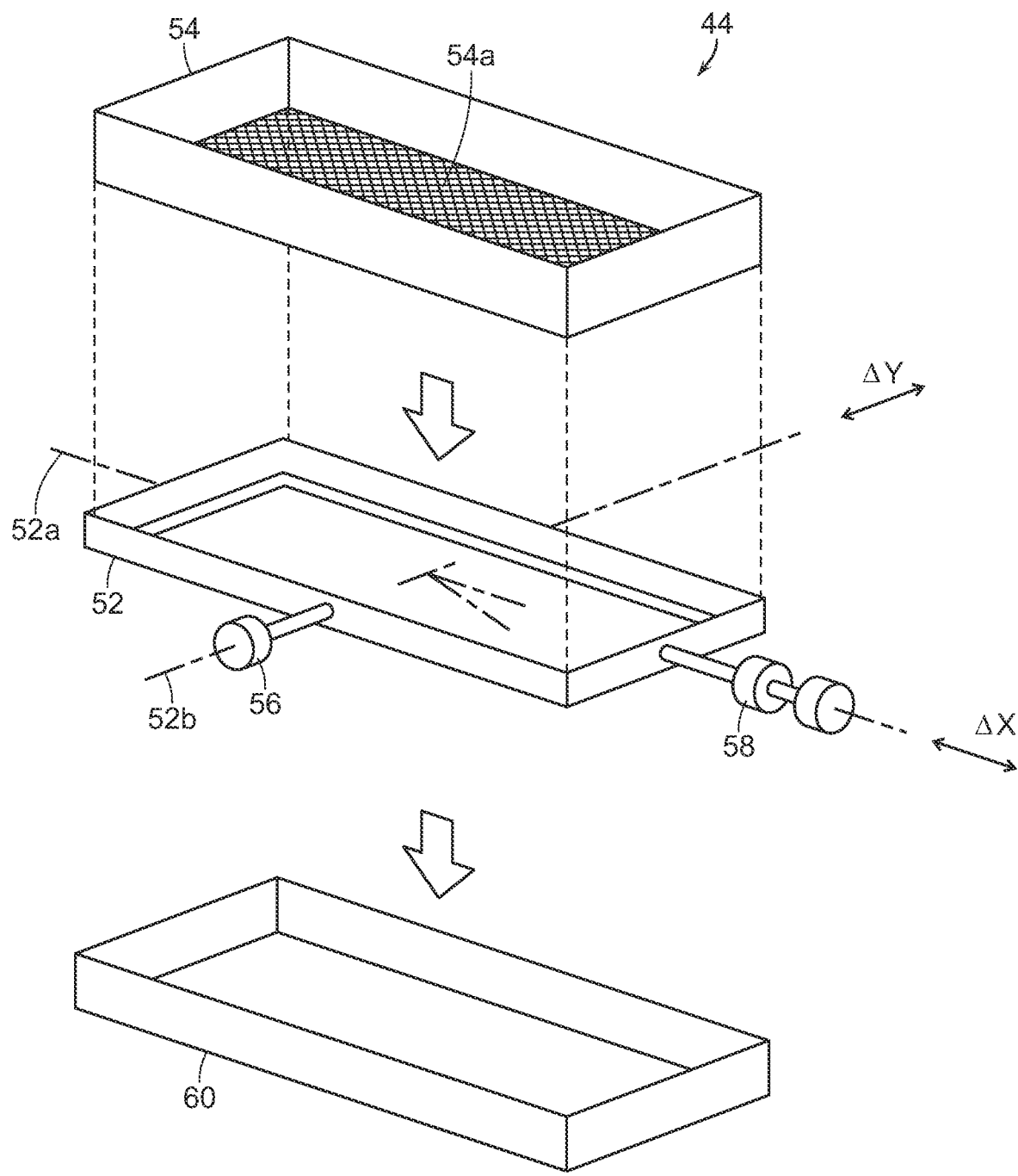
FIG. 3 is an exploded illustration of a vibrating shaker used in the system of the present invention.

As shown in FIG. 3, the second stage or screen shaker 44 involves transferring a predetermined volume of the hydrocarbon slurry 24 from the agitator 42 to the shaker 44 via a feeder. To control this transfer, and ensure the proper amount of hydrocarbon slurry is sent to the shaker 44, a by-pass valve is incorporated to return excess hydrocarbon slurry to the agitator 42, as necessary. Upon transfer, the hydrocarbon slurry is vibrated in the screen shaker 44 to separate most of the residual mineral solids from the hydrocarbon slurry 24. The shaker 44 produces the recovered solids 22 and the first extractant 26. The second stage or screen shaker 44 preferably removes up to 10% of the remaining mineral solids. As discussed elsewhere, it simultaneously dissolves up to 10% of the remaining hydrocarbon solids.

Insofar as the shaker 44 is concerned, its essential components structurally include: a frame 52; a screen basket 54 comprising a screen mesh 54a; an angle adjuster 56 that is mounted on the frame 52; and a vibrator 58 which is connected to the frame 52. The screen mesh 54a is preferably a 50 mesh screen, i.e., 50 openings per square inch, with an opening size of about 300 microns. In this combination, the screen basket 54 is dimensioned for engagement with the frame 52. Further, the screen mesh 54a of the screen basket 54 can be either a woven metal cloth, a combination of at least one metal cloth and a backing cloth, or a corrugated mesh. Moreover, it is also envisioned that the screen basket 54 can be periodically disengaged from the frame 52 to periodically remove solids from the screen basket 54.

For the present invention, the frame 52 defines both a longitudinal axis 52a and an orthogonal lateral axis 52b relative to a horizontal plane. Also, the angle adjuster 56 is connected with the frame 52 for orienting the screen basket 54 at a predetermined inclination angle ($\alpha$). For this purpose, the inclination angle ($\alpha$) will be measured around the lateral axis 52b in a range between 15° above the horizontal plane, and 15° below the horizontal plane (i.e. $\alpha$ is between +15° and −15°).

As indicated above, a vibrator 58 is engaged with the frame 52. The purpose here is to vibrate the frame 52, together with the screen basket 54, back and forth along the longitudinal axis 52a defined by the frame 52. Preferably, the vibrator 58 will include a plurality of motors that act together to vibrate the frame 52 with the screen basket 54 linearly along the longitudinal axis 52a. As an additional feature, the vibrator 58 can also include a motor for vibrating the frame 52 and the screen basket 52 back and forth along the lateral axis 52b to thereby establish a generally elliptical path for vibrating the frame 52 and the screen basket 54.

Operationally, the shaker 58 vibrates the hydrocarbon slurry 24 at moderate frequencies. The result of this vibration is the removal of residual solids and the creation of the first extractant 26 which contains only a remnant of the residual solids from the hydrocarbon slurry 24. The residual solids remaining in the first extractant 26 will typically constitute a mineral solids weight of up to 10% of the total weight. In addition to separating up to 10% of the original mineral solids, the shaking 16 step is designed to dissolve up to 10% of the hydrocarbon based solids not dissolved in the prior agitating 12 step. During an operation of the shaker 44, a collection pan 60 is employed for receiving the first extractant 26 (underflow) from the screen basket 54, before further transfer to the centrifuge 46.

Figure 4:
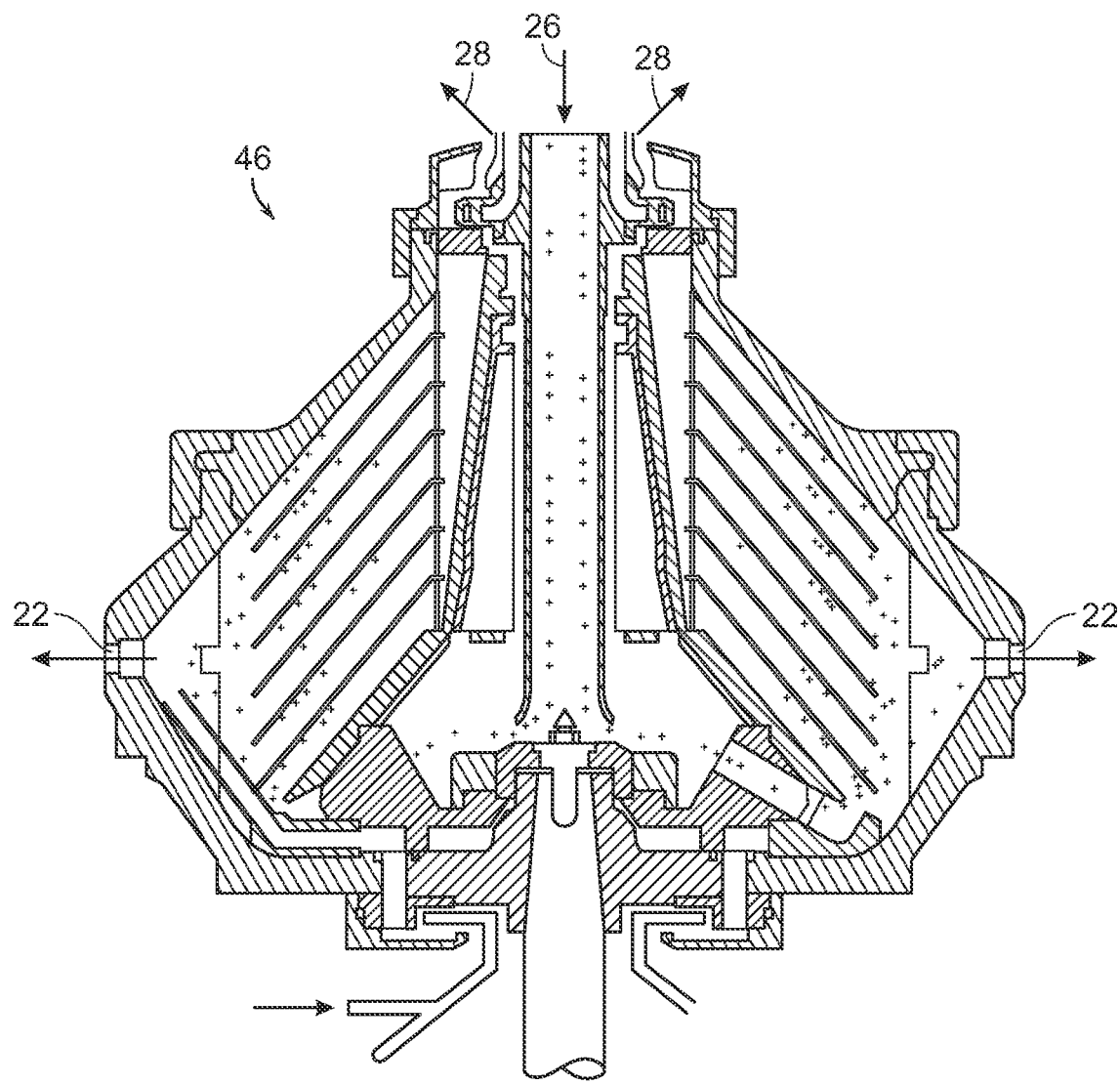
FIG. 4 is a cross-sectional view of a high g-force device used in the system of the present invention.
Figure 5:
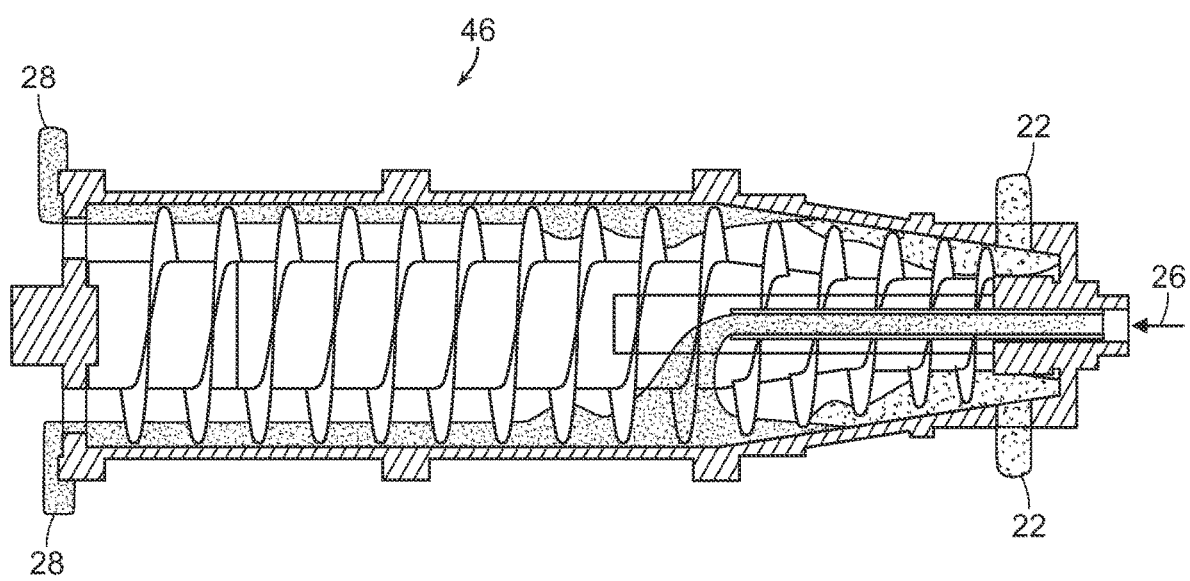
FIG. 5 is a cross-sectional view of an alternate high g-force device used in the system of the present invention.

As shown in FIGS. 4 and 5, the third stage or centrifuge-type device 46 spins the first extractant 26 at extremely high G-forces greater than 3,000 Gs to further separate hydrocarbons from the solids. For an operation of this third stage, first extractant 26 from the shaker 44 is delivered directly into the centrifuge device 46. During this third stage, extremely high G forces are generated on the first extractant 26 to separate as much of the remnant solids from the weight as possible. The result here is the creation of the second extractant 28 wherein solids constitute a weight less than 0.2% of the total weight. The third stage or centrifuge 46 preferably removes up to an additional 10% of the remaining mineral solids. As discussed elsewhere, it also simultaneously dissolves up to 10% of the remaining hydrocarbon solids.

Ideally, there are two types of the centrifuges useable in the system 40—a disc stack centrifuge (FIG. 4) and a decanter centrifuge (FIG. 5). Centrifuges have two major functions in the process. First, to separate solid particles from the slurry 24 or extractant 26 obtained in the previous stages of the extraction process. Decanter centrifuges remove particles in the size range of 10 microns and higher, and disc stack centrifuges remove smaller particles.

While the principles of operation of one or more of the devices used in the inventive system and process may be known, the combined operation of the particular devices achieves extraction results that were previously unknown or achievable without significantly higher energy input, significantly longer residence times, increase production of environmental contamination, or utilization of costly reaction components. The inventive system and process achieves improved operation in each of those aspects.

Although multiple preferred embodiments have been described in detail for purposes of illustration, various modifications may be made without departing from the scope and spirit of the invention. Accordingly, the invention is not to be limited, except as by the appended claims.

What is claimed is:

1. A process for extracting raw hydrocarbons from hydrocarbon containing material, comprising the steps of:
   preparing the hydrocarbon containing material to create a prepared hydrocarbon ore;
   adding a hydrocarbon solvent to the prepared hydrocarbon ore to create a hydrocarbon slurry;
   agitating the hydrocarbon slurry in an extraction tank;
   transferring the hydrocarbon slurry from the extraction tank to a mechanical separator; and
   mechanically separating raw hydrocarbons from the hydrocarbon slurry comprising shaking the hydrocarbon slurry in a screen mesh shaker to produce a first extractant product, wherein the screen mesh shaker comprises an angle adjuster on a frame and the angle adjuster pivots the frame between fifteen degrees below and fifteen degrees above a horizontal plane.

2. The process of claim 1, wherein the preparing step comprises one or more of tearing, crushing, and grinding of the hydrocarbon containing material.

3. The process of claim 1, wherein the agitating step further comprises adding a secondary solvent to the prepared hydrocarbon ore; and the mechanically separating step further comprises recovering the secondary solvent from the raw hydrocarbons.

4. The process of claim 1, wherein the screen mesh shaker separates solid particles having a diameter greater than 300 microns in diameter from the first extractant product.

5. The process of claim 1, wherein the mechanically separating step further comprises the step of spinning the hydrocarbon slurry in a centrifuge to produce a first extractant product.

6. The process of claim 5, wherein the centrifuge spins the hydrocarbon slurry applying G-forces greater than 3,000 Gs.

7. The process of claim 1, wherein the mechanically separating step further comprises the step of spinning the first extractant product in a centrifuge to produce a second extractant product.

8. The process of claim 7, wherein the second extractant product comprises less than 0.2% solids by weight.

9. The process of claim 1, wherein the hydrocarbon solvent comprises a very short chain hydrocarbon.

10. The process of claim 1, wherein the hydrocarbon slurry comprises about 60%-70% solids by weight.

11. The process of claim 1, wherein the first extractant product comprises about 1%-5% solids by weight.

12. A system for extracting raw hydrocarbons from hydrocarbon containing material, comprising:
   an agitating device having an extraction tank for mixing the hydrocarbon containing material with a solvent and producing a hydrocarbon slurry;
   a first separating device in fluid communication with an outlet on the agitating device for receiving the hydrocarbon slurry and producing a first hydrocarbon extractant said first separating device comprising, a shaking device having a screen mesh basket in fluid communication with the outlet on the agitating device, the shaking device having a vibrating motor for vibrating a screen mesh bed;
   said shaking device further comprising:
      a frame defining a longitudinal axis and a lateral axis, wherein the longitudinal axis and the lateral axis are orthogonal to each other;
      wherein the screen mesh basket is adapted for engagement with the frame and to receive the hydrocarbon slurry from the agitating device;
      wherein the screen mesh basket is adapted for disengagement from the frame to periodically remove solids therefrom;
      wherein the vibrating motor is engaged with the frame for vibrating the frame and the screen mesh basket along the longitudinal axis of the frame;
      an angle adjustment motor for orienting the frame with the screen mesh basket, at a predetermined inclination angle ($\phi$) measured around the lateral axis relative to the longitudinal axis;
   a second separating device in fluid communication with an outlet on the first separating device for receiving the first hydrocarbon extractant and producing a second hydrocarbon extractant; and
   a hydrocarbon recovery tank in fluid communication with an outlet on the second separating device for receiving the second hydrocarbon extractant.

13. The system of claim 12, wherein the second separating device comprises a centrifugal device in fluid communication with the outlet on the first separating device, the centrifugal device having a spinning motor for subjecting the first hydrocarbon extractant to G-forces greater than 3,000 Gs.

14. The system of claim 12, further comprising:
   a feeder device for receiving hydrocarbon slurry from the agitating device, and for transferring a predetermined volume of hydrocarbon slurry to the shaking device; and
   a by-pass valve for returning excess hydrocarbon slurry from the shaking device to the agitating device.

15. The system of claim 12, wherein the shaking device further comprises a collection pan for receiving underflow from the screen mesh basket when the shaking device is in operation.

16. The system of claim 12, wherein the inclination angle ($\phi$) is in a range of 15° above and 15° below a horizontal plane.

17. The system of claim 12, wherein the screen mesh basket is made from a mesh selected from the group consisting of a woven metal cloth, a combination of at least one metal cloth and a backing cloth, and a corrugated mesh.

18. The system of claim 12, wherein the vibrating device further comprises a second vibrating motor for vibrating the frame and the screen mesh basket back and forth along the lateral axis.

* * * * *